US006421768B1

(12) United States Patent
Purpura

(10) Patent No.: US 6,421,768 B1
(45) Date of Patent: Jul. 16, 2002

(54) METHOD AND SYSTEM FOR AUTHENTICATION AND SINGLE SIGN ON USING CRYPTOGRAPHICALLY ASSURED COOKIES IN A DISTRIBUTED COMPUTER ENVIRONMENT

(75) Inventor: Stephen J. Purpura, Kirkland, WA (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 09/305,423

(22) Filed: May 4, 1999

(51) Int. Cl.[7] .............................................. G06F 12/00
(52) U.S. Cl. ........................ 711/164; 711/156; 713/202
(58) Field of Search ................................ 711/164, 100, 711/156; 713/177, 202, 201, 171, 175, 180; 705/200

(56) References Cited

U.S. PATENT DOCUMENTS

| 5,781,629 | A | * | 7/1998 | Haber et al. ................. 713/177 |
| 5,794,207 | A | * | 8/1998 | Walker et al. ................. 705/23 |
| 5,875,296 | A | * | 2/1999 | Shi et al. ..................... 713/202 |
| 5,903,721 | A | * | 5/1999 | Sixtus ......................... 713/201 |
| 6,061,790 | A | * | 5/2000 | Bodnar ........................ 713/171 |
| 6,073,241 | A | * | 6/2000 | Rosenberg et al. ......... 713/201 |
| 6,092,196 | A | * | 7/2000 | Reiche ........................ 713/200 |

OTHER PUBLICATIONS

"AFS@umbc," http://userpages.umbc.edu/~banz/afs_old; Aug. 22, 1998; pp. 1–8.
Derrick R. Wright, "Microsoft's EC Strategy: Too Little Too Late?"; Mar. 26, 1999; http://www.scis.nova.edu/WWW-BOARD/scis/c179/messages/142.html; pp. 1–2.
"Web Authorization/Authentication," May 15. 1998; http://www.brown.edu/Facilities/CIS/ATGTest/Infrastructure/Web_Access_Control/GoalsOptions.html; pp. 1–10.
"Web Authorization/Authentication," first version Nov. 1, 1996, modified Oct. 1997; http://www.brown.edu/Facilities/CIS/ATGTest/Infrastructure/Web_Access_Control/GoalsOptions-ver2.html; pp. 1–12.
Tim Torgenrud, "Stanford Web Security Service Proposal: Version 0.85," Nov. 11, 1996; http://www.stanford.edu/~torg/WWW-security.doc.html; pp. 1–10.
Bruce Schneier, "Applied Cryptography: Protocols, Algorithms, and Source Code in C," 1st edition, John Wiley and Sons N.Y. (1992); pp. 417–425 (Section 17.4).

* cited by examiner

Primary Examiner—David Hudspeth
Assistant Examiner—Fred F. Tzeng
(74) Attorney, Agent, or Firm—Robert B. Beyers; Joseph Yang; Skadden, Arps

(57) ABSTRACT

Cryptographically assured data structures are created to enable a single sign on and/or authentication method for securely transferring user authentication information from a first computer to a second computer to allow the user to seamlessly interact with the second computer without necessarily re-authenticating himself thereto. Thus, if a second computer trusts the methods used by a first computer to authenticate a user, then the second computer can use a cryptographically assured cookie created by the first computer to authenticate the user, without requiring the user to perform an explicit authentication step at the second computer. More particularly, a cryptographically assured cookie is made by creating a cryptographically assured voucher of a user characteristic at the first computer, and embedding the voucher into a cookie for transmission to the user's computer and hence to the second computer.

38 Claims, 2 Drawing Sheets

METHOD AND SYSTEM FOR AUTHENTICATION AND SINGLE SIGN ON USING CRYPTOGRAPHICALLY ASSURED COOKIES IN A DISTRIBUTED COMPUTER ENVIRONMENT

FIELD OF THE INVENTION

The present invention relates to securely transferring user authentication information from a first computer to one or more other computers to allow the user to interact with the other computers without necessarily having to explicitly identify himself thereto. More particularly, the present invention includes the use of cryptographically assured cookies in a distributed computer environment.

BACKGROUND OF THE INVENTION

The widespread proliferation of links among networked computers allows users to effortlessly navigate from one computer to another. For example, in the Internet environment, users can obtain publicly available information by following links from any computer to any other computer, in an anonymous fashion, without previously knowing of, being known to, or having an account on, the other computer. However, to access certain secure areas of a business's web site, or to carry out an electronic transaction (e.g., a purchase), the user must typically be known to and/or have an account on, that web site. Today, the user must perform a separate sign on and/or authentication process with each such web site, i.e., the fact that the user has authenticated himself to a first site can not be easily transferred to an unrelated second site.

The data structures known as "cookies" have conventionally served as a general mechanism by which server computers can store and retrieve information on a client computer. For example, a conventional cookie allows a server computer to customize its web site for a particular client computer by reading the preferences information stored in a conventional cookie in the client computer. Typically, the server computer would be a computer running a business's web site and the client computer would be a user's computer running a web-browser program. Conventional cookies are also used to authenticate registered users of a particular web site without requiring them to sign in again every time they access that same web site. Additional information regarding conventional cookies can be found at http://www.illuminatus.com/cookie.fcgi.

However, conventional cookies can not be used for transferring authentication from one site to another site for two reasons. First, the degree of security provided by conventional cookie authentication is inadequate for many types of transactions, even in the single site (same site) case. For example, banks offering on-line banking services on the Internet often require sophisticated security measures for the storage of highly confidential information that are not contemplated by conventional cookies.
Second
  A browser will not give up it's cookie data to any server except the one that set it. If your browser went around spewing all it's cookies to every site you hit this would be a security risk and would make cookies worthless. (emphasis in the original—see http://www.illuminatus.com/cookie.fcgi)

Therefore, the conventional mechanism of cookies does not allow for transferring authentication. Instead, the user must perform a separate authentication process with each business web site, even if the user has already gone through a reliable, secure authentication process at a previous business web site. This multiple sign on process is redundant, inefficient, and cumbersome for the user. As the amount of business being done on the Internet increases, or as specialization leads to the outsourcing to third parties of certain parts of an electronic transaction such as bill payment, this multiple sign on process will become increasingly cumbersome for the user.

All of the foregoing shows that there is a need to develop methods and systems for securely transferring user authentication information from a first computer to a second computer to allow the user to seamlessly interact with the second computer without necessarily re-authenticating himself thereto.

SUMMARY OF THE INVENTION

The present invention overcomes the limitations and disadvantages of the prior art by providing a method for securely transferring user authentication information from a first computer to a second computer to allow the user to seamlessly interact with the second computer without necessarily re-authenticating himself thereto. Cryptographically assured data structures are created to enable a single sign on and/or authentication method. Thus, if a second computer trusts the methods used by a first computer to authenticate a user, then the second computer can use a cryptographically assured cookie created by the first computer to authenticate the user, without requiring the user to perform an explicit authentication step at the second computer.

This system has numerous advantageous over the prior art. The user does not necessarily have to go through an explicit authentication step at each business web site (although, for added security, such could also be used). In addition, the user does not necessarily have to remember authentication information such as user names and user passwords for each business web site. The transfer of user authentication information can be done easily, seamlessly, and securely, thus facilitating transactions in which the user either does not know the second computer, or would be inconvenienced by having to separately authenticate himself thereto. The first and second computers could be, without limitation, virtually any type of content service provider on the Internet.

In an exemplary embodiment of the invention particularly well suited to Internet applications, a cryptographically assured cookie is made by creating a cryptographically assured voucher at the first computer, and embedding the voucher into a cookie for transmission to the user's computer and hence to the second computer. Although conventional cookies and cryptography are both known in the prior art, the combination of these two components to create a new type of cryptographically assured cookie is not known or suggested by the prior art. Indeed, the prior art teaches away from cookies as used in the present invention.

For example, as discussed in the Background, the prior art teaches away from the present invention by prohibiting cookies created by one server (i.e., a first computer) from being disclosed to or read by another server (i.e., a second computer). More particularly, the prior art teaches that this would create a security risk and make cookies worthless. These prior art teachings concerning conventional cookies are diametrically opposed to the present invention, which teaches how to have cookies created by one computer be read by other computers without creating a security risk.

The foregoing and other embodiments and aspects of the present invention will become apparent to those skilled in the art in view of the subsequent detailed description of he invention taken together with the appended claims and the accompanying figures.

DETAILED DESCRIPTION OF THE INVENTION

Figure 1:
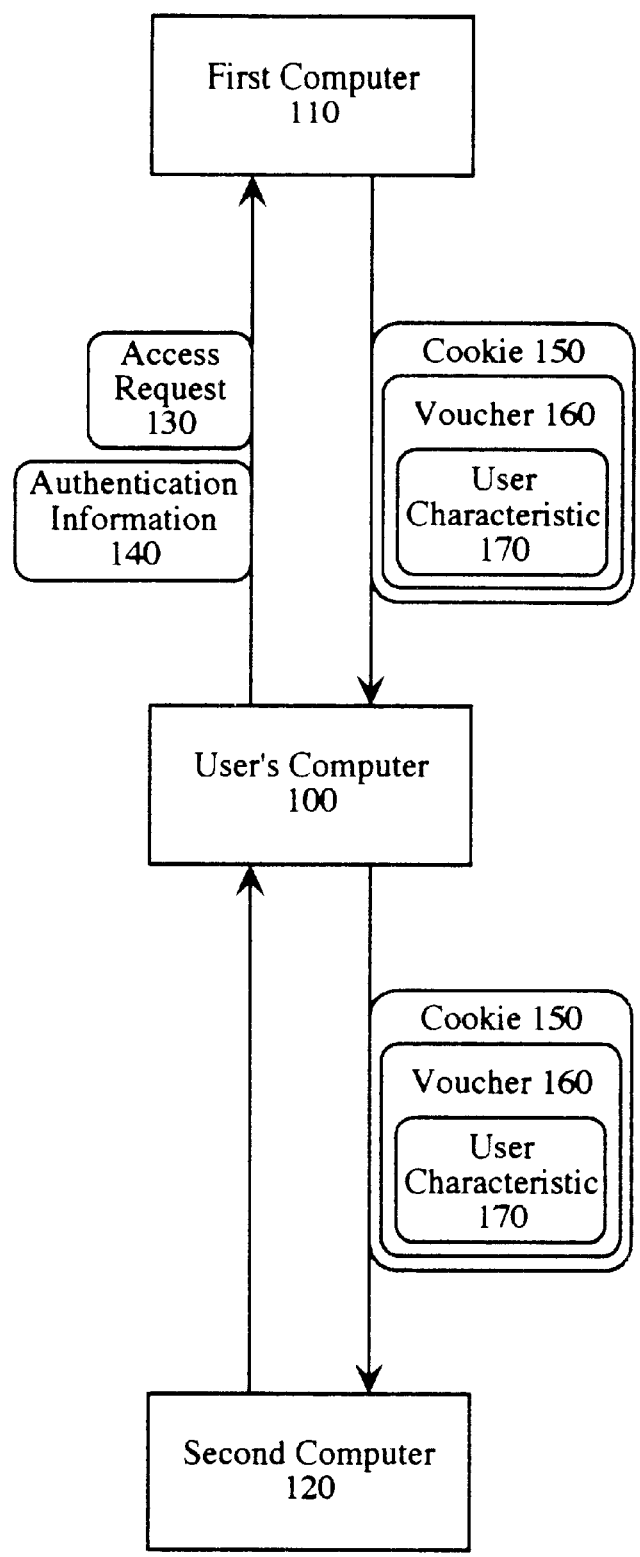
FIG. 1 is a schematic illustrating an exemplary system allowing authentication and single sign on using cryptographically assured cookies.

FIG. 1 illustrates an exemplary system for authentication and single sign on in which a user (at user computer 100) known to a first computer 110 but not to a second computer 120 can, via a single sign on to the first computer 110, be authenticated thereby to the second computer 120 via the mechanism of a cryptographically assured cookie. As used herein, the term computer refers to any device that processes information using an integrated circuit chip, including without limitation mainframe computers, desktop computers, portable computers, embedded computers, and hand-held computers.

Figure 2:
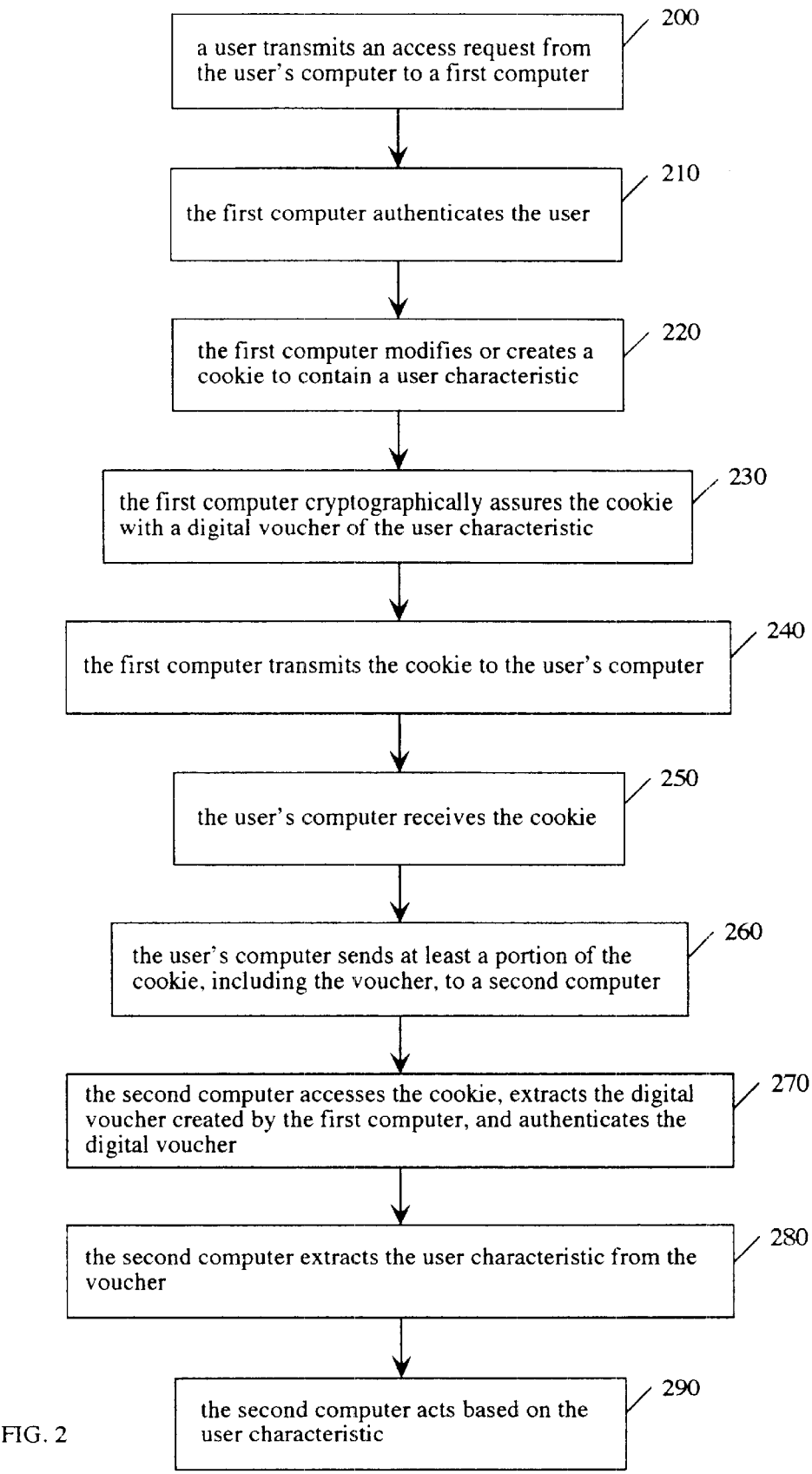
FIG. 2 is a flow chart illustrating an exemplary method for authentication and single sign on using cryptographically assured cookies.

Referring now to FIG. 2, at step 200, the user transmits an access request 130 from the user's computer 100 to the first computer 110. The user also sends authentication information 140 to the first computer 110, which the first computer 110 uses to authenticate the user at step 210. Depending on the extent of the previous relationship (if any) between the user and first computer 110, and the desired level of security, such authentication information could encompass a wide range of possibilities, ranging from simple passwords all the way to so-called digital certificates.

In any event, once the first computer 110 authenticates the user, such authentication may be transferred to the second computer 120 as follows. The first computer 110 uses a data structure for passing the authentication to the second computer 120. In an exemplary embodiment particularly well suited for Internet applications, the data structure could be a cryptographically assured cookie 150 that is made by creating a cryptographically assured voucher 160 at the first computer 110, and embedding the voucher 160 into the cookie 150 for transmission to the user's computer 100 and hence to the second computer 120.

More particularly, after having authenticated the user, at step 220 the first computer 110 either: (a) embeds a user characteristic 170 in an existing cookie; or (b) creates a new cookie containing user characteristic 170. User characteristics 170 could include virtually any data that first computer 110 wishes to send to the second computer 120 based on the first computer's authentication of the user and/or to facilitate the second computer's authentication of the user. Thus, without limitation, user characteristic 170 may include information such as the user's network identity, domain, password, account number, and session preferences.

In an exemplary embodiment, at step 230, the first computer 110 cryptographically assures all or part of user characteristic 170 to create a digital voucher 160 that is placed in the cookie 150 and, at step 240, transmits the cookie 150 to the user's computer 100. The cryptographic assurance can be provided by any of a number of well-known asymmetric or symmetric encryption protocols such as RSA or DES or combinations thereof. For example, if asymmetric cryptography is used, the first computer 110 could encrypt or digitally sign the user characteristic 170 (or the digital voucher 160) using the first computer's private key. A second computer 120 having the corresponding public key could then decrypt the encryption (or signature) to verify or authenticate the user characteristic 170.

The second computer 120 could already have the first computer's public key (e.g., from a prior transaction) or could obtain it via any of a number of standard techniques including but not limited to: (a) via an off-line key exchange; (b) from a commonly known trusted third party, or (c) via the first computer's digital certificate. These and other standard techniques for secure key exchange, as well as details of the aforementioned protocols, are well known to those skilled in the art and need not be described in detail here.

The digital voucher 160 may optionally include such information as the user's identity at the second computer 120, the domain identity of the first computer 110, the creation time for the digital voucher 160, an expiration time for the digital voucher 160, information for synchronizing the time outs of the first computer 110 and the second computer 120, instructions to return the user to the first computer 110 when communication with the second computer 120 ends, instructions to send the user to another computer when communication with the second computer 120 ends, and any other characteristic of the voucher and/or the communication.

The expiration time for the digital voucher 160 can be set to a relatively small increment from the time the voucher was created to increase the security of the system. The system security increases as the time increment decreases. The security of the system can also be increased by having the second computer 120 check the validity of the time that the cookie 150 was created, the validity of the expiration time, and/or that the time on the second computer 120 has not reached the expiration time specified in the voucher 160. In general, but especially for small time increments, it is advantageous to synchronize the times at the first and second computers. The Internet standard time synchronization protocol NTP can be used to synchronize the time of the first computer 110 and the second computer 120.

At step 250, the user's computer 100 receives the cookie 150 and at step 260, sends at least a portion of the cookie 150, including the digital voucher 160, to the second computer 120. Alternatively, the first computer 110 can cause the user's computer 100 to automatically be redirected to the second computer 120. For example, if a user is viewing a bank's web site and requests to pay his bills, the first computer 110 could redirect the user to a third-party bill presentment/payment web site. In an Internet environment, this could be accomplished by the first computer 110 sending the user's web browser an HTTP header refresh command that redirects the user's web browser to the second computer's web site. This and other techniques for other network environments are well known to, and will be appreciated by, those skilled in the art. In addition, the first computer 110 can send information about data, services, or in virtually any other aspect of the first computer 110 that the user is permitted to access. For example, the bill presentment/payment web site could be instructed to display brand information or advertising about a bank's web site.

At step 270, the second computer 120 accesses the cookie, extracts the digital voucher 160 created by the first computer 110, and authenticates the digital voucher. At step 280, the second computer 120 extracts the user characteristic 170 from the digital voucher 160, thus authenticating the user without necessarily requiring the user to expressly identify himself to, and/or access, the second computer 120.

As described previously, in the prior art there is no sharing of cookie data created by a first computer with a second computer that did not place the cookie on the user's computer 100. Such sharing can be achieved by having the first computer 110 and the second computer 120 share a domain. For example, if the first computer 110 was a bank web site and the second computer 120 was a third-party bill payment/presentment web site, then these two computers could share a domain by having respective web site addresses www.bank.com and bills.bank.com, with the cookie domain set to bank.com. In other words, the third-party bill site dynamically mimics or aliases the bank's domain (e.g., via the domain name system (DNS) infrastructure).

The foregoing system is particularly useful when the second computer 120 is unknown to the user. In the exemplary Internet environment, the second computer 120 could be a web site link on a web page of the first computer 110. For example, the web site link could be a third-party back office site performing bill presentment/payment services in connection with a merchant's sales interface on the first computer 110. Of course, there is no requirement that the second computer 120 be unknown to the user, as the invention may be used any time it is desirable or convenient that the user be able to access a second computer 120 without having to expressly identify himself thereto. Furthermore, such identification can be for security reasons (e.g., a customer accessing his bank or some other financial services at second computer 120 via an Internet portal at the first computer 110) or otherwise (e.g., the first computer 110 has a contract to share user identities and other marketing data with a partner of the second computer 120).

In some cases, business or other considerations may allow user authentication and/or further transactions at the second computer 120 only when the user has been previously registered or enrolled at the second computer 120. One way to accomplish this registration is to have the first computer 110 send a list of its users to the second computer 120 for automatic enrollment. The user registration could include the user's network identity and the domain identity of the first computer 110. Another way to accomplish this registration is to have the user register directly with the second computer 120.

In general, it will be appreciated that there could be virtually any relationship between first computer 110 and second computer 120, ranging from collocation and/or co-ownership to virtual anonymity (except that second computer 120 must be able to authenticate first computer 110 in order to use the first computer's cryptographic assurance, if any, of the digital voucher).

After authenticating the user, the second computer 120 may perform virtually any other act based on the user characteristic 170 at step 290. For example, if the second computer 120 provides bill presentment/payment services, then after authenticating the user the second computer 120 might retrieve the user's bill information and send a bill page to the user's browser for display. Other than the new web address, the user might be unaware that he has been redirected to a different web site and that the web pages he is viewing are coming from a different server.

As noted above, cryptographic assurance can be provided by any of a number of well-known asymmetric or symmetric encryption protocols. The use of a combination of asymmetric and symmetric encryption protocols is one alternative that is particularly advantageous for overall system speed. In particular, asymmetric encryption could be used to transfer a shared symmetric key between the first computer 110 and the second computer 120. For example, the first computer 110 could encrypt or digitally sign the shared key using public key cryptography. A second computer 120 having the corresponding key could then decrypt the encryption (or signature) to obtain the shared key. The first computer 110 could then use the shared key to symmetrically encrypt the user characteristic 170 in the digital voucher 160, while the second computer 120 would use the shared key to decrypt the encrypted digital voucher 160.

For this alternative, the use of a shared key to encrypt and decrypt the digital voucher 160 is advantageous because symmetric encryption and decryption can be done much faster than asymmetric encryption and decryption. Asymmetric encryption is only used here to securely transmit the shared key from the first computer 110 to the second computer 120. The shared key could be transmitted from the first computer 110 to the second computer 120 by placing the asymmetrically encrypted shared key in a cookie that is sent to the user's computer 100 and is then redirected or resent to the second computer 120. This communication process also uses a cryptographically assured cookie to send information from the first computer 110 to the second computer 120, but here the information being sent is the shared key rather than the user characteristic 170. The user characteristic 170 would then be sent via a separate user characteristic cookie 150 of the type described earlier. Alternatively, the user characteristic and the shared key can be part of a single combined cookie.

Prior to the present invention, direct communication between a first computer and a second computer, rather than indirect communication via a third computer (e.g., a user's computer) with a cookie, was used to transmit a shared key from the first computer to the second computer.

The foregoing describes a new method for transmitting a shared key from a first computer to a second computer, but those skilled in the art will recognize that many other alternatives are possible. For example, the shared key could be generated and sent by the second computer 120, or could be mutually generated by both the first and second computers using a key exchange protocol. These and other methods for sharing keys between two computers are well known in the art (see, e.g., *Applied Cryptography* by Bruce Schneir) and need not be described in detail here.

The following can further improve the speed and security of this combined asymmetric/symmetric method for cryptographic assurance. The speed of the system can be enhanced by using the shared key (sent from the first computer 110 to the second computer 120 via, e.g., a cryptographically assured cookie) to authenticate additional users. In other words, the shared key received via a cryptographically assured cookie for one user could be used to decrypt other users' digital vouchers as well. Such reuse of the shared key can eliminate multiple executions of the slower asymmetric decryption protocol when the first computer 110 will be authenticating many users to the second computer 120. Shared key reuse can be implemented in many ways. For example, the first computer 110 could monitor/record the previous transmission of the shared key and simply not resend the key if it had already been sent. Alternatively, the second computer 120 could monitor/record the previous transmission of the shared key and simply not decrypt a (redundant) received shared key if it had already been decrypted. Another alternative could include signaling within the cookie (which includes either no shared key, a redundant shared key, or a new shared key)

via some sort of identifier, which could be the absence of a shared key, the retransmission of the shared key, the inclusion of a new shared key, or even some form of non-key identifier. A hash could be used to allow quick comparisons with previous transmissions.

The security of the shared key method could be enhanced if the shared key had an expiration date/time, so that, for example, the first computer 110 would have to send a new asymmetrically encrypted shared key after a certain (e.g., relatively short) time interval to users who were going to be redirected to the same second computer 120. The interval would reflect a balance between speed and security for the system. Yet another measure, applicable to both the asymmetric and the combined asymmetric/symmetric methods, increases the security of the communications among any combination of the user's computer 100, the first computer 110, and the second computer 120 (including, without limitation, during transmitting step 240, receiving step 250, and sending step 260) by utilizing the Secure Sockets Protocol (SSL) or other secure networking protocols, all of which are well known in the art.

The various embodiments described above should be considered as merely illustrative of the present invention and not in limitation thereof. They are not intended to be exhaustive or to limit the invention to the forms disclosed. Those skilled in the art will readily appreciate that still other variations and modifications may be practiced without departing from the general spirit of the invention set forth herein. Therefore, it is intended that the present invention be defined by the claims which follow:

What is claimed is:

1. A method for transferable authentication, by which a user accessing a first computer can be authenticated to a second computer remote from said first computer, without necessarily requiring the user to explicitly identify himself to said second computer, comprising the steps of:
    a) at a user's computer, accessing said first computer;
    b) authenticating said user to said first computer;
    c) receiving from said first computer a cookie including said first computer's digital voucher of a user characteristic, said voucher being cryptographically assured by said first computer, said user characteristic being encrypted and incorporated into said digital voucher by said first computer using a session key confidential to said first computer and said second computer but unknown to said user, said session key being cryptographically assured using an asymmetric key of at least one of said first computer and said second computer;
    d) transmitting said cryptographically assured session key to said second computer via said user's computer; and
    e) sending at least a portion of said cookie, including said voucher, to said second computer configured to:
        (1) authenticate said voucher without necessarily requiring said user to explicitly identify himself to said second computer;
        (2) extract said user characteristic from said voucher; and
        (3) perform an action based on said user characteristic.

2. A method for transferable authentication, by which a user accessing a first computer can be authenticated to a second computer remote from said first computer, without necessarily requiring the user to explicitly identify himself to said second computer, comprising the steps of:
    a) at said first computer, receiving an access request from said user;
    b) receiving authentication information from said user;
    c) creating a cookie containing a user characteristic;
    d) cryptographically assuring said cookie with a digital voucher of said user characteristic, said user characteristic being encrypted and incorporated into said digital voucher by said first computer using a session key confidential to said first computer and said second computer but unknown to said user, said session key being cryptographically assured using an asymmetric key of at least one of said first computer and said second computer;
    e) transmitting said cryptographically assured session key to said second computer via said user's computer; and
    f) sending said cookie to said user's computer to be at least partially forwarded to said second computer that can:
        (1) authenticate said voucher;
        (2) extract said user characteristic from said voucher; and
        (3) perform an action based on said user characteristic.

3. The method of claim 2, wherein said first computer and said second computer are not collocated.

4. The method of claim 3, wherein said first computer and said second computer have different owners.

5. The method of claim 3, wherein said first computer and said second computer share a common domain.

6. The method of claim 3, wherein said voucher includes an expiration time.

7. The method of claim 3, wherein said voucher includes an instruction to send said user to another computer after communication with said second computer.

8. The method of claim 3, wherein said voucher includes an instruction to return said user to said first computer after communication with said second computer.

9. The method of claim 3, wherein said first computer and said second computer have synchronized timeouts.

10. The method of claim 3, wherein said user characteristic comprises the user's network identity.

11. The method of claim 3, wherein said user characteristic comprises the user's session preferences.

12. The method of claim 3, wherein said user computer includes a web browser.

13. The method of claim 3, wherein at least one of said first and second computers is a web site.

14. The method of claim 13, wherein said first computer is a web site of a content service provider.

15. The method of claim 13, wherein said second computer is a web site for electronic bill presentment and payment.

16. The method of claim 3, wherein said cryptographic assurance includes RSA cryptography.

17. The method of claim 3, wherein said cryptographic assurance includes encryption of said user characteristic under a symmetric key shared between said first computer and said second computer.

18. The method of claim 17, further comprising exchanging between said first computer and said second computer via a cookie on said user's computer a cryptographic assurance of said symmetric key under an asymmetric key of at least one of said first computer or said second computer.

19. A method for transferable authentication, by which a user accessing a first computer can be authenticated to a second computer remote from said first computer, without necessarily requiring the user to explicitly identify himself to said second computer, comprising the steps of:
    a) at said second computer, receiving at least a portion of a cookie from a user wherein said cookie was:

(1) created by said first computer,
(2) sent to the user, and
(3) cryptographically assured with a digital voucher of a user characteristic created by said first computer, said user characteristic being encrypted and incorporated into said digital voucher by said first computer using a session key confidential to said first computer and said second computer but unknown to said user, said session key being cryptographically assured using an asymmetric key of at least one of said first computer and said second computer;

b) receiving said cryptographically assured session key from said first computer via said user;

c) authenticating said digital voucher created by said first computer;

d) extracting said user characteristic from said voucher; and e) performing an action based on said user characteristic.

20. The method of claim 19, wherein said first computer and said second computer are not collocated.

21. The method of claim 19, wherein said first computer and said second computer have different owners.

22. The method of claim 19, wherein said first computer and said second computer share a common domain.

23. The method of claim 19, wherein said voucher includes an expiration time.

24. The method of claim 19, wherein said voucher includes an instruction to send said user to another computer after communication with said second computer.

25. The method of claim 19, wherein said voucher includes an instruction to return said user to said first computer after communication with said second computer.

26. The method of claim 19, wherein said first computer and said second computer have synchronized timeouts.

27. The method of claim 19, wherein said user characteristic comprises the user's network identity.

28. The method of claim 19, wherein said user characteristic comprises the user's session preferences.

29. The method of claim 19, wherein said user computer includes a web browser.

30. The method of claim 19, wherein at least one of said first and second computers is a web site.

31. The method of claim 30 wherein said first computer is a web site of a content service provider.

32. The method of claim 30, wherein said second computer is a web site for electronic bill presentment and payment.

33. The method of claim 19, wherein said cryptographic assurance includes RSA cryptography.

34. The method of claim 19, wherein said cryptographic assurance includes encryption of said user characteristic under a symmetric key shared between said first computer and said second computer.

35. The method of claim 34, further comprising exchanging between said first computer and said second computer via a cookie on said user's computer a cryptographic assurance of said symmetric key under an asymmetric key of at least one of said first computer or said second computer.

36. A method for transferable authentication, by which a user accessing a first computer can be authenticated to a second computer remote from said first computer, without necessarily requiring the user to explicitly identify himself to said second computer, comprising the steps of:

a) transmitting an access request from a user's computer to said first computer;

b) authenticating said user to said first computer;

c) creating a cookie containing a user characteristic at said first computer;

d) cryptographically assuring said cookie with a digital voucher of said user characteristic at said first computer, said user characteristic being encrypted and incorporated into said digital voucher by said first computer using a session key confidential to said first computer and said second computer but unknown to said user, said session key being cryptographically assured using an asymmetric key of at least one of said first computer and said second computer;

e) transmitting said cryptographically assured session key from said first computer to said second computer via said user's computer;

f) transmitting said cookie to said user's computer;

g) receiving from said first computer a cookie including said first computer's digital voucher of said user characteristic, said voucher being cryptographically assured by said first computer;

h) sending at least a portion of said cookie, including said voucher, to said second computer, i) authenticating said digital voucher created by said first computer at said second computer;

j) extracting said user characteristic from said voucher at said second computer; and k) performing an action based on said user characteristic.

37. A system for transferable authentication, by which a user accessing a first computer can be authenticated to a second computer remote from said first computer, without necessarily requiring the user to explicitly identify himself to said second computer, comprising:

a) means for transmitting an access request from a user's computer to a first computer;

b) means for authenticating said user to said first computer;

c) means for creating a cookie containing a user characteristic at said first computer;

d) means for cryptographically assuring said cookie with a digital voucher of said user characteristic at said first computer, said user characteristic being encrypted and incorporated into said digital voucher by said first computer using a session key confidential to said first computer and said second computer but unknown to said user, said session key being cryptographically assured using an asymmetric key of at least one of said first computer and said second computer;

e) means for transmitting said cryptographically assured session key from said first computer to said second computer via said user's computer;

f) means for transmitting said cookie to said user's computer;

g) means for receiving from said first computer a cookie including said first computer's digital voucher of said user characteristic, said voucher being cryptographically assured by said first computer;

h) means for sending at least a portion of said cookie, including said voucher, to said second computer;

i) means for authenticating said digital voucher created by said first computer at said second computer;

j) means for extracting said user characteristic from said voucher at said second computer; and k) means for performing an action based on said user characteristic.

38. A data structure for transferable authentication, by which a user accessing a first computer can be authenticated to a second computer remote from said first computer, without necessarily requiring the user to explicitly identify himself to said second computer, comprising:

a) a digital voucher
  (1) containing a user characteristic available to said first computer; and
  (2) cryptographically assured by said first computer;

b) said user characteristic being encrypted and incorporated into said digital voucher by said first computer using a session key confidential to said first computer and said second computer but unknown to said user, said session key being cryptographically assured using an asymmetric key of at least one of said first computer and said second computers, said session key being transmitted from said first computer to said second computer via said user's computer;

c) said digital voucher embedded in a cookie configured to be transmitted from said first computer to a user's computer and then at least partially forwarded to said second computer configured to:
  (1) authenticate said voucher without requiring said user to explicitly identify himself to said second computer;
  (2) extract said user characteristic from said voucher; and
  (3) perform an action based on said user characteristic.

* * * * *

UNITED STATES PATENT AND TRADEMARK OFFICE
CERTIFICATE OF CORRECTION

PATENT NO. : 6,421,768 B1  
DATED : July 16, 2002  
INVENTOR(S) : Purpura

It is certified that error appears in the above-identified patent and that said Letters Patent is hereby corrected as shown below:

Column 8,
Lines 23, 25, 27 and 29, delete "3" and insert -- 2 -- therefor.
Lines 32, 35, 37 and 39, delete "3" and insert -- 2 -- therefor.
Lines 41, 43, 50 and 52, delete "3" and insert -- 2 -- therefor.

Signed and Sealed this

Twenty-sixth Day of November, 2002

Attest:

Attesting Officer

JAMES E. ROGAN
Director of the United States Patent and Trademark Office